C. Amazeen,
Operating Windlasses.
N° 16,000. Patented Nov. 4, 1856.
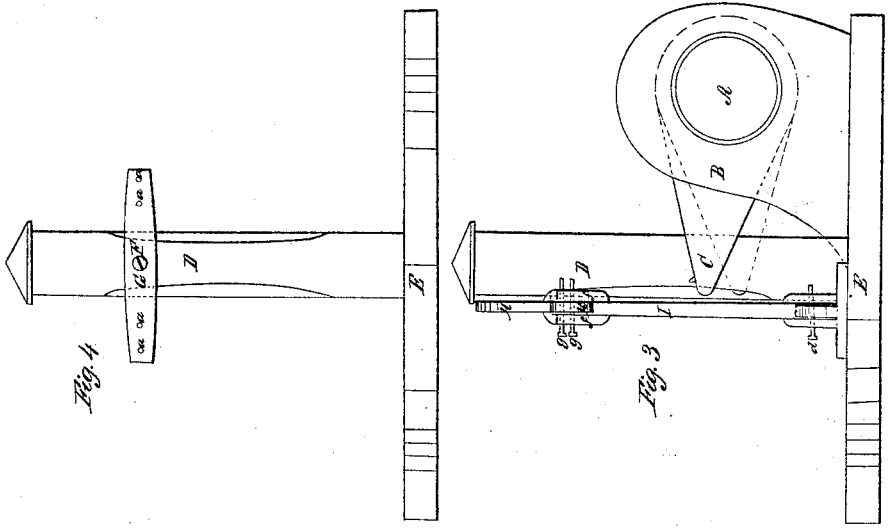
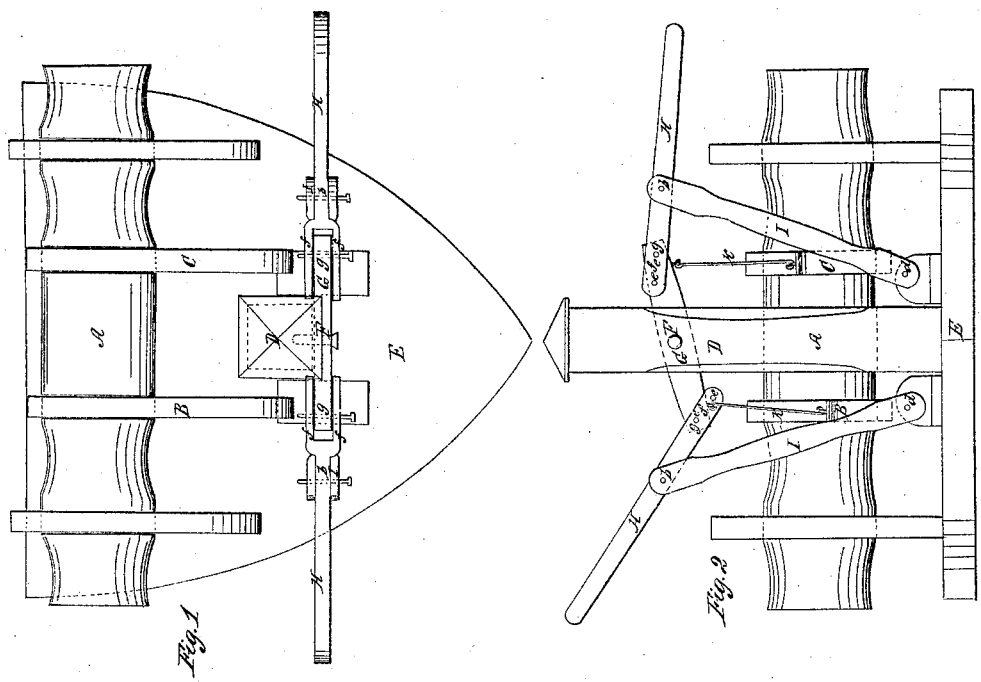

UNITED STATES PATENT OFFICE.

CHRISTOPHER AMAZEEN, OF NEW CASTLE, NEW HAMPSHIRE.

MACHINERY FOR OPERATING THE PAWL-CASES OF SHIPS' WINDLASSES.

Specification of Letters Patent No. 16,000, dated November 4, 1856.

*To all whom it may concern:*

Be it known that I, CHRISTOPHER AMAZEEN, of New Castle, in the county of Rockingham and State of New Hampshire, have invented Improved Machinery for Operating the Pawl-Cases of a Ship's Windlass; and I do hereby declare that the same is fully described and represented in the following specification and the accompanying drawings, of which—

Figure 1, is a top view of a windlass having my invention applied to it. Fig. 2, a front elevation of the same. Fig. 3, an end elevation thereof.

In such drawings A, represents a windlass provided in the usual manner with two pawl cases B, C, which in order to operate or turn said windlass are to be respectively applied to ratchets on said windlass, and are to be alternately moved in opposite directions in vertical planes, in the usual manner one of the said pawl cases being raised while the other is depressed. Directly in front of the windlass there is placed a vertical post D, which is properly secured to the deck, E, of a vessel and rises up between the pawl cases as seen in Figs. 1, and 2.

On a fulcrum, F, extended from the front side of said post, a connector lever, G, is arranged, the fulcrum passing through the middle of the lever. Each arm of the said connector is provided with a series of holes *a, a*, as shown in Fig. 4, which is a side view of said lever; such lever serving to connect two forks of the brake levers H, H, each of which has its fulcrum *b*, at the upper part of one of two vibratory posts, I, I, which are arranged as seen in Figs. 1, 2, and 3, and turn in a vertical plane either toward or away from one another, and on fulcra *d, d*, secured to the deck. There is a series of holes, *e, e*, formed through the forks of each of the brake levers, as seen at *f, f*, &c. A, pin, *g*, extended through a brake lever, and the connector joins such brake lever to said connector G. By means of two pitmen, K, K, the arms of lever, G, are respectively connected with the pawl cases B, C, each pitman being so jointed to the lever and the pawl case that when said lever is turned upon its fulcrum it shall work or turn the pawl cases, in the manner in which they are usually operated by brakes. By changing the pin from one hole to another, of the series of holes formed through the connector and brake levers as described, we can vary the leverage exerted on the pawl cases to move them, that is to say, the farther the said pin is arranged from the fulcrum of the connector lever, G, the greater will be the leverage or power exerted by the brake lever in order to elevate or depress the pawl cases.

By the mechanism, hereinbefore described the pawl cases may be worked, either at a quick or slow speed under any amount of power applied to the brake levers, the extent of leverage being increased under slow speed and diminished under a fast one. This peculiarity of my invention renders it of much value on ship board.

I am aware that it is not new to operate the pawl cases by a single brake lever; and that a lever working on a vibratory post is not new, as the same has been applied to a pump, therefore, I do not claim such. Nor do I lay claim to a single brake lever, and two levers or series of levers applied to a windlass so as to turn it by a single gear affixed on it, as is shown in the specifications and drawings of Nialance and Pelatiah Osgood's rejected applications for patents.

My invention has reference to two pawl cases, B, C, and their two gears as applied to a single windlass barrel, they having reciprocatory movements in opposite directions given to them.

What therefore I claim is—

My arrangement of the brake levers, H, H, connection lever, G, vibratory posts, I, I, and two pawl cases B, C, as applied to a post and windlass barrel substantially as specified.

In testimony whereof, I have hereunto set my signature this eleventh day of April 1856.

CHRISTOPHER AMAZEEN.

Witnesses:
R. H. EDDY,
F. P. HALE, Jr.